UNITED STATES PATENT OFFICE.

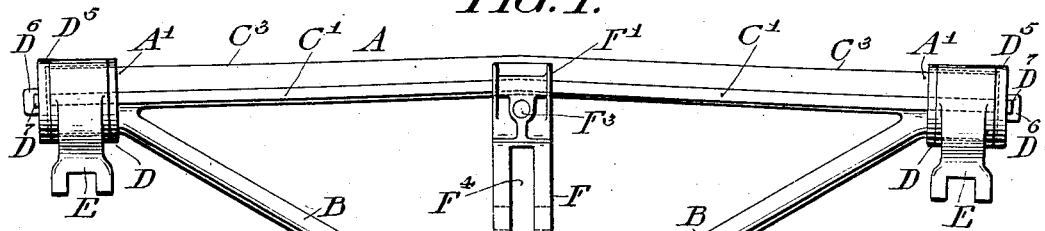
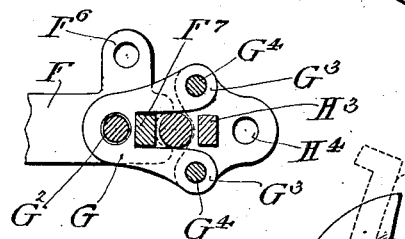
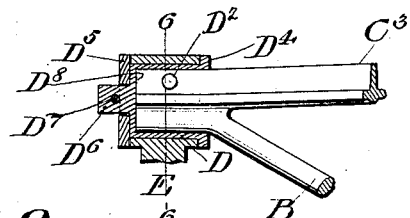
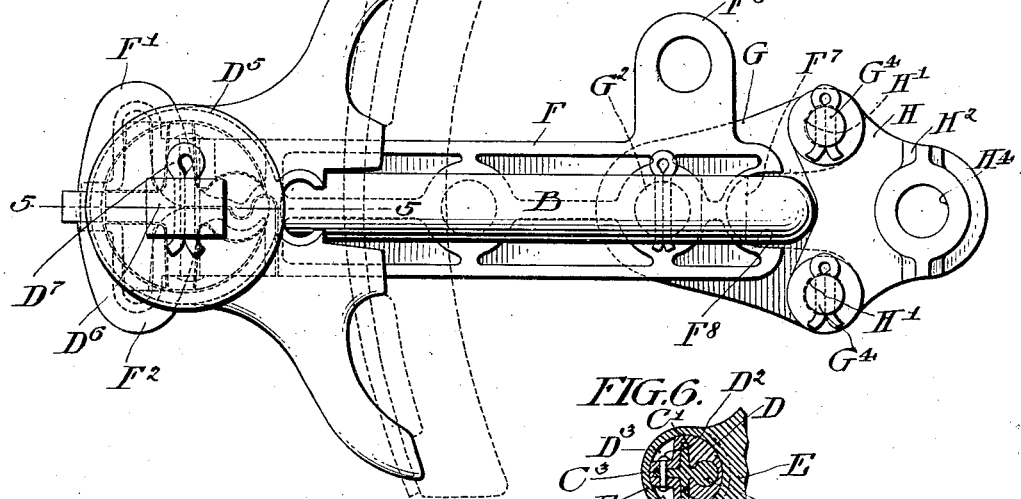
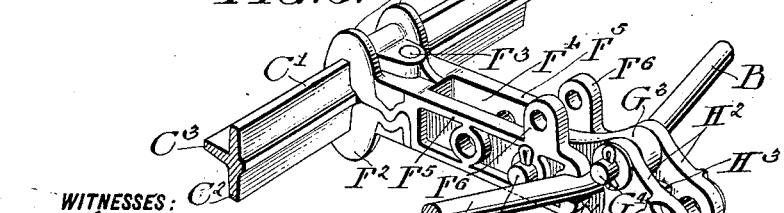

NATHAN H. DAVIS, OF PHILADELPHIA, PENNSYLVANIA.

BRAKE-BEAM.

No. 863,158.      Specification of Letters Patent.      Patented Aug. 13, 1907.

Application filed August 6, 1906. Serial No. 329,494.

*To all whom it may concern:*

Be it known that I, NATHAN H. DAVIS, a citizen of the United States of America, residing in the city and county of Philadelphia, in the State of Pennsylvania, have invented a certain new and useful Improvement in Brake-Beams, of which the following is a true and exact description, reference being had to the accompanying drawings, which form a part thereof.

My present invention relates to brake beams and particularly to brake beams of the truss type and has for its object to improve the construction of the struts employed in such beams and also to improve the means for supporting the brake heads on the beam.

The various features of novelty which characterize my invention are pointed out with particularity in the claims annexed to and forming a part of this specification. For a better understanding of my invention, however, and the advantages possessed by it, reference may be had to the accompanying drawings and descriptive matter in which I have illustrated and described one of the forms in which it may be embodied.

Of the drawings, Figure 1 is a plan view of a complete brake beam. Fig. 2 is an end elevation on a larger scale of the beam shown in Fig 1. Fig. 3 is a perspective view showing the strut and a portion of the beam. Fig. 4 is a section on the line 4—4 of Fig 1 and Fig. 5 is a section on the line 5—5 of Fig 2. Fig. 6 is a section on the line 6—6 of Fig. 5.

In the drawings, I have shown my invention employed in conjunction with a beam proper of the type shown in my Patent 683,729, granted October 1, 1901, in which the beam A is formed from a flanged bar, cruciform in cross-section, one flange B, which is practically round in cross-section being separated from the body of the bar to form the tension member of the truss beam and the other three flanges $C'$, $C^2$, and $C^3$ forming the compression member C of the beam. The ends $A'$ of the beam retaining the original shape of the bar from which the beam is made.

On each end of the beam I secure an end member D formed with a cruciform passage $D'$ to receive the end of the beam. The end members $D'$ may be secured in place by proportioning the parts so that a driving fit is obtained between the ends of the beam and the members. One more rivet $D^2$ may be employed as shown in Fig. 6 to secure each end member in place. When the rivets are employed the members D may be cut away as shown at $D^3$ in Fig. 6. The outer surface of the body of each member D is shaped to enter the cylindrical passage $E'$ formed in the corresponding brake head E. The inner end of each brake head which is thus swiveled on the end of each brake member D abuts against a flange of the end member. A washer $D^5$ secured on a projection $D^6$ of the end member by means such as a cotter pin $D^7$ prevents accidental removal of the brake head. As shown in Fig. 5 the end members are preferably made with an end wall $D^8$ closing the outer ends of the slots $D'$.

The strut extending between the tension and compression members transversely to the length of the beam comprises a main strut member F having an integral jaw $F'$ and a coöperating movable jaw $F^2$ secured in place by a bolt or rivet $F^3$ for securing the strut member F to the compression member of the beam. The body of the member F is formed with a slot $F^3$ to receive a brake lever. The walls $F^5$ at the side of the slot $F^4$ are each provided with supporting ears $F^6$. The front ends of the portions $F^6$ are connected by an integral shoulder or bridge portion $F^7$ which may have its back side parallel to the top and bottom sides as shown. This end of the strut member is formed with a curved seat $F^8$ to receive the inner surface of the tension member B of the beam.

A U-shaped member G having its inner surface fitted to bear against the bridge $F^7$ is loosely secured in place by a pin $G^2$ extending between the strut parts $F^5$. The legs of the member G are provided with eyes $G^3$ receiving pins $G^4$ which also pass through eyes $H'$ formed in a yoke member H. The yoke member H comprises two side members $H^2$ which bear against opposite sides of the member G and are integrally connected by a bridge member $H^3$. The members $H^3$ are provided with eyes $H^4$ by which a connection may be made to brake operating mechanism. The member H is provided with a curved seat to receive the outer surface of the tension member of the beam.

It will be observed that in the construction just described the strut member F is anchored securely to the tension member or the beam by means of the members G and H and that the latter members form brake actuating mechanism which applies force to the beam through the somewhat massive bridge member $F^7$ and the strut of which it forms a part. The pin $G^2$ is employed simply to hold the parts in place and as a safety connection between the strut and the members G and H. The means employed for swiveling the brake heads on the brake beam is simple in construction, easily assembled and highly satisfactory and reliable in operation when employed on a brake beam of the character disclosed.

Certain features of my invention shown and described but not claimed herein are claimed in my co-pending application Ser. No. 329,493 filed of even date herewith.

Having now described my invention, what I claim as new and desire to secure by Letters Patent is

1. A brake beam having a one piece end irregular in cross-sectional outline, an end member having a socket formed in it to receive said end and having the outer portion of its body cylindrical and provided with an axial extension, a brake head swiveled on said cylindrical body portion and means secured to said reduced portion of said member for preventing axial displacement of said brake head.

2. In combination, a brake beam comprising tension and compression members, a strut provided at one end with split clamping jaws for engaging the compression member of the beam and formed at the other end with a socket to receive the inner edge of the tension member and also provided with a shoulder extending substantially parallel to the length of the beam and brake actuating mechanism surrounding said shoulder and said tension member.

3. In combination, a brake beam comprising tension and compression members, a strut connected at one end to the compression member of the beam, provided at the other end with a socket to receive the inner edge of the tension member, and having a shoulder extending parallel to the general direction of the beam, a U shaped member straddling said shoulder and said tension member with its yoke engaging said shoulder, and a loose connection between said U shaped member and strut.

4. In combination, a brake beam comprising tension and compression members, a strut connected at one end to the compression member of the beam and provided at the other end with a socket to receive the inner edge of the tension member and having a shoulder extending parallel to the general direction of the beam, a U shaped member straddling said shoulder and said tension member with its yoke engaging said shoulder, and a second U shaped member reversely placed with respect to the first, said U shaped members having their legs connected together.

5. In combination, a brake beam comprising tension and compression members, a strut member extending between said tension and compression members and provided with a portion adjacent the tension member extending parallel to the general direction of the beam, means for securing the strut to the compression member, a U shaped member straddling said strut portion and the tension member and bearing against said strut portion with its yoke, a second U shaped member straddling said tension member with its yoke at the outer side of the tension member and having its legs secured to the legs of the first mentioned U shaped member.

6. In combination, a brake beam comprising tension and compression members, a strut member extending between said tension and compression members and formed with a slot intermediate its ends, a U shaped member having its yoke located in said slot and its legs extending at opposite sides of said tension member.

7. In combination, a brake beam comprising tension and compression members, a strut member extending between said tension and compression members and formed with a slot intermediate its ends, a U shaped member having its yoke located in said slot and its legs extending at opposite sides of said tension member, and a second U shaped member reversely placed with respect to the first and having its legs secured to the legs thereof, whereby said U shaped members serve to lock the tension member and the corresponding end of the strut together.

8. In combination, a brake beam having tension and compression members, a strut having one end secured to the compression member and the other end engaging the tension member and provided with the shoulder $F^7$ having its top and bottom sides substantially parallel to each other, and its back side substantially transverse to the top and bottom sides and the U shaped member G fitted to straddle said shoulder and bear against the rear side thereof.

9. In combination, a brake beam comprising tension and compression members, a strut extending between said members and provided with a shoulder extending substantially parallel to the length of the beam and located between said members, and brake actuating mechanism straddling said tension member and engaging said shoulder.

10. In combination, a brake-beam comprising tension and compression members, a strut secured at one end to the compression member of the beam and formed at the other end with a socket to receive the inner edge of the tension member, and also provided with a shoulder extending substantially parallel to the length of the beam, and brake actuating mechanism surrounding said shoulder and said tension member.

NATHAN H. DAVIS.

Witnesses:
ARNOLD KATZ.
S. STEWART.